United States Patent [19]

Rawlings et al.

[11] Patent Number: 4,680,149
[45] Date of Patent: Jul. 14, 1987

[54] MOLD AND METHOD FOR SPIN CASTING A PRECISELY CONFIGURED ARTICLE

[75] Inventors: David L. Rawlings, Bayville; Robert E. Glick, Huntington Station, both of N.Y.; Robert Chang, Philadelphia, Pa.

[73] Assignee: International Hydron Corporation, Woodbury, N.Y.

[21] Appl. No.: 865,217

[22] Filed: May 19, 1986

[51] Int. Cl.⁴ ............................................. B29D 11/00
[52] U.S. Cl. .................................... 264/2.1; 264/311; 425/425; 425/434; 425/808
[58] Field of Search ................. 264/2.1, 311; 425/425, 425/808, 434

[56] References Cited

U.S. PATENT DOCUMENTS

| | | |
|---|---|---|
| 2,976,576 | 3/1961 | Wichterle et al. . |
| 3,220,960 | 11/1965 | Wichterle . |
| 3,274,301 | 9/1966 | Kulp, Jr. ............................. 264/2.1 |
| 3,380,718 | 4/1968 | Neefe . |
| 3,460,928 | 8/1969 | Casko . |
| 3,505,229 | 4/1970 | Skehan . |
| 3,660,545 | 5/1972 | Wichterle . |
| 3,699,145 | 11/1972 | Sianesi et al. . |
| 3,810,874 | 5/1974 | Mitsch et al. . |
| 3,810,875 | 5/1974 | Rice et al. . |
| 3,814,741 | 6/1974 | Caporiccio et al. . |
| 3,882,193 | 5/1975 | Rice et al. . |
| 3,894,129 | 7/1975 | Hoffman et al. . |
| 3,902,693 | 9/1975 | Crandon et al. ..................... 425/808 |
| 3,940,207 | 2/1976 | Barkdoll . |
| 4,113,224 | 9/1978 | Clark et al. ......................... 425/808 |
| 4,121,896 | 11/1978 | Shepherd . |
| 4,247,492 | 1/1981 | Neefe . |
| 4,440,918 | 4/1984 | Rice et al. . |
| 4,457,880 | 7/1984 | Neefe . |
| 4,497,754 | 2/1985 | Padoan .............................. 425/808 |
| 4,517,138 | 5/1985 | Rawlings et al. . |
| 4,517,139 | 5/1985 | Rawlings et al. . |
| 4,517,140 | 5/1985 | Rawlings . |
| 4,540,532 | 9/1985 | Petren et al. ........................ 425/808 |

FOREIGN PATENT DOCUMENTS

EP84406 of 0000 European Pat. Off. .
2040213 of 0000 United Kingdom .

Primary Examiner—James Lowe
Attorney, Agent, or Firm—Vincent P. Pirri; Peter G. Dilworth

[57] ABSTRACT

An improved mold apparatus and spin casting method adapted for use in the molding of precisely configured articles, e.g., a contact lens, from a liquid polymerizable reaction mixture containing at least one volatile component is disclosed. Loss of this volatile component from the reaction mixture is prevented by providing a separate reservoir filled with a liquid volatile substance which volatilizes and fills the space above the liquid polymerization mixture.

15 Claims, 3 Drawing Figures

MOLD AND METHOD FOR SPIN CASTING A PRECISELY CONFIGURED ARTICLE

BACKGROUND OF THE INVENTION

The present invention relates to the field of molding methods and molding apparatus. More particularly, the invention relates to a method for the spin, or centrifugal, casting of a precisely configured article such as a contact lens or other opthalmic device, disc valve, etc., from an initially liquid polymerizable mixture.

In accordance with known procedures for spin casting a contact lens such as that disclosed in U.S. Pat. No. 3,660,545, a liquid polymerizable material is introduced into a mold having a cylindrical wall and an exposed concaved bottom surface and the mold is caused to rotate about its vertical axis at a rotational speed and under polymerization conditions sufficient to create a centrifugal force which causes a radially outward displacement of the contents in the mold. By maintaining the rotating mold under predetermined conditions, the outwardly displaced polymerizable material is caused to polymerize to a solid polymeric contact lens. The resulting lens is characterized by a convex optical surface which corresponds to the concave surface of the mold and a concave optical surface whose geometric configuration has been precisely defined, to a significant degree, by the centrifugal force(s) employed during the polymerization cycle.

In one variation of this spin casting method, a plurality of individual molds each of which has been dosed with a predetermined quantity of polymerizable material is arranged in a carousel with each mold being individually rotated on its own separate vertical axis as disclosed in aforesaid U.S. Pat. No. 3,660,545.

In yet another variation of the foregoing spin casting procedure, a plurality of individual molds, each containing a precisely measured quantity of polymerizable material, is arranged in a vertically disposed rotatable polymerization tube adapted to receive the molds at its upper end. As the molds which are seated one on top of the other move downwardly through the tube due to their own weight, they pass while spinning through a zone maintained under polymerization conditions and emerge from the bottom of the tube with the lens in each mold fully formed.

These known methods of spin casting contact lenses have worked with satisfactory results employing the polymerizable materials disclosed in U.S. Pat. Nos. 2,976,576 and 3,220,960. These materials upon undergoing polymerization provide sparingly cross-linked water-absorptive polymeric hydrogels, e.g., poly(2-hydroxyethyl methacrylate) or "HEMA". When contact lenses fashioned from such hydrogels contain a high water content, they exhibit a high oxygen permeability and are therefore comfortable to wear.

However, known spin casting techniques do not provide a satisfactory lens product when the polymerizable material contains a component which has a comparatively low boiling point, which is to say, is fairly volatile under the conditions of the spin casting process. Because loss of even minute quantities of the volatile component(s) of a polymerizable material can result in unacceptable deviations from the predetermined geometric configuration of the final molded article and/or can result in off-specification changes in its composition, present spin casting procedures are unsuitable for manufacturing precisely configured articles from the relatively volatile polymerizable materials described, for example, in U.S. Pat. No. 4,440,918, the contents of which are incorporated by reference herein.

U.S. Pat. No. 4,440,918 discloses the manufacture of opthalmic devices including a contact lens, from a polymer formed from a polymerizable material containing a telechelic perfluoropolyether, a compatible comonomer and optionally, a free radical initiator or photoinitiator. The representative compatible comonomers include such relatively volatile materials as methyl and ethyl acrylate, methyl and ethylmethacrylate, and the like. Similarly, the photoinitiators and free radical initiator which may be present in the polymerizable material are also fairly volatile and include ketones such as acetophenone, 2,2-diethoxyacteophenone, etc.

Under the mildly exothermic conditions of polymerization, sufficient quantities of such volatile component(s) will be given off in the known spin casting procedures described above as to result in an unacceptable article. The problems owing to such volatilization are further compounded due to the fact that the volatilized materials frequently result in malfunctioning of the spin casting apparatus and usually being toxic in nature, pose an environmental risk. Previous attempts to overcome these problems involve additional complications rendering them impractical. One approach involves saturating the polymerization environment with the volatile component. This poses physical problems of processing in a closed system containing corrosive and/or flammable and/or toxic vapors. The existence of vapor concentration gradients within this larger closed system volume can also create problems of inconsistency.

Another approach to overcome the problems referred to, namely, doping the polymerization reaction mixture with an additional amount of volatile component(s), requires that the quantity to be added be accurately determined. At most, one can only approximate this amount and any change in the conditions from those assumed in determining the amount to be added will result in further deficiency or excess of the volatile component(s).

Commonly assigned, copending Rawlings U.S. patent application Ser. No. 690,794, filed Jan. 11, 1985 describes yet another solution to the problem posed by the volatilization of polymerization reaction component(s). A mold is described therein which possesses gas-tight sealing means which minimizes the loss of volatile component(s) from the liquid polymerizable material. However, even with this mold, there will be some loss of volatile material into the open space between the upper surface of the polymerizable mixture and the lower surface of the mold sealing means. As small as this loss may be, in come cases it may be sufficient to result in a spincast article which is of less than optimum quality.

SUMMARY OF THE INVENTION

In accordance with the present invention, in a mold for spin casting a precisely configured article which possesses at least one precisely configured surface for spin casting the article from an initially liquid polymerization reaction material containing at least one substance which is volatile under spin casting conditions and means for sealing the mold cavity against any appreciable loss of said volatile substance during the spin casting process, there being a volume of open space between the upper surface of the polymerization mixture and the lower surface of the sealing means, an improvement is provided which comprises reservoir means communicating with said open space, said reservoir means being adapted to receive a liquid material which is, or contains, a substance which is volatile under spin casting conditions such as that during spin casting, volatilized substance from the reservoir means enters the open space reducing the loss of volatilized substance from the polymerization reaction mixture into said open space.

The reservoir means feature of the foregoing mold results in self-adjustment of the composition of the volatile substance in the open space below the sealing means as the spin casting conditions change. Thus, the tendency of the liquid material in the reservoir to undergo volatilization will parallel changes in temperature and pressure thereby compensating for varying conditions.

When the liquid material in the reservoir is a substantially pure material, it will evaporate faster than its counterpart present in the polymerization reaction mixture. In these circumstances, the volatile substance present in the open space will be preferentially derived from the contents of the reservoir means compared with that contributed by the polymerization reaction mixture. This will ensure an even more constant composition of polymerization reaction mixture. In additiion to said improved mold, the invention herein provides a spin casting method which takes full advantage of the advantageous features of the mold. Employing such spin casting method and mold apparatus, there can be produced precision articles of predetermined and exacting details and dimensions from polymerizable materials containing one or more relatively volatile components, e.g., the polymerizable mixtures of U.S. Pat. No. 4,440,918 more fully discussed below, e.g., small medical devices such as heart valves and diaphragms; contact lenses, and the like. Such articles, depending on the ultimate use, can be hard, flexible, or soft and can be hydrophilic or hydrophobic. In particular, the novel mold and spin casting method can be utilized in the manufacture of a wide variety of contact lenses which can be symmetrical or asymmetrical and further characterized as hard, flexible, or soft, water-absorptive or non-water-absorptive.

DESCRIPTION OF THE PREFERRED EMBODIMENTS

Figure 1:
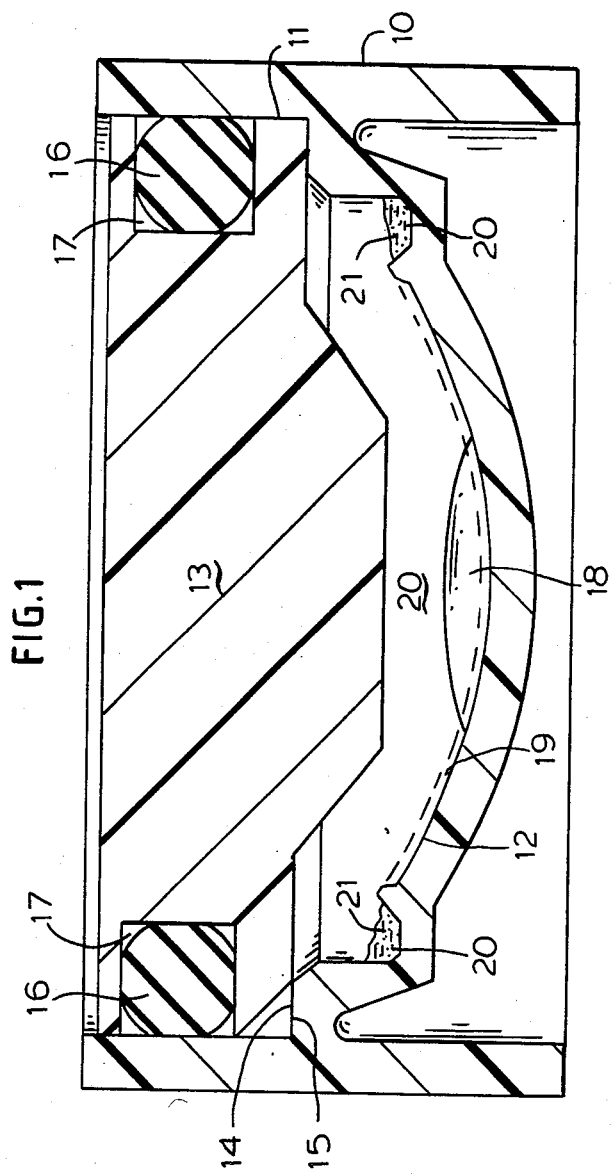
FIG. 1 is a greatly enlarged side elevation view of a preferred embodiment of a sealed mold in accordance with the present invention which is especially adapted for use in manufacturing a contact lens. The mold shows a liquid polymerizable lens-forming material prior to spin casting and the precisely configured finished lens (indicated by the dotted line) following spin casting.

As previously noted, the materials to be spun cast employing the mold apparatus of this invention are those containing at least one component whose volatility is of such character that if permitted to go unimpeded during the spin casting procedure, the consequent loss of such component would result in a spun cast article having an unacceptable composition and/or geometric figuration.

The mold apparatus and spin casting method of the present invention are especially adapted to be used in the fabrication of contact lenses employing the volatile polymerization reaction mixtures of U.S. Pat. No. 4,440,918. According to this patent, a contact lens or other opthalmic device can be prepared from the polymerizate resulting from the reaction of a telechelic perfluoropolyether such as any of those disclosed in U.S. Pat. Nos. 3,505,229; 3,669,145; 3,810,874; 3,810,875; 3,814,741; and 3,882,193, the disclosures of which are incorporated by reference herein, and from 2 to 50% by weight of an ethylenically unsaturated comonomer which is compatible with the perfluoropolyether. Conventional lens-forming procedures, i.e., casting a lens in a closed mold and machining (lathing) a lens from a buttom of material, are contemplated by U.S. Pat. No. 4,440,918.

The telechelic perfluoropolyether component of the polymerizable reaction mixture described in U.S. Pat. No. 4,440,918 has a backbone having a number average molecular weight between about 500 and about 15,000, desirably about 600 to 8,000, and has the formula

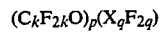

$(C_kF_{2k}O)_p(X_qF_{2q})$ wherein p represents the number of $-C_kF_{2k}O-$ subunits in said backbone and is an integer of from 3 to 200; q is an integer of from 1 to 4; and k may be the same or different within each of said $-C_kF_{2k}O-$ subunits and is an integer of from 1 to 4. The $-C_kF_{2k}O-$ and $-C_qF_{2q}-$ subunits are randomly distributed in the backbone.

Preferably, from 50 to 88% by weight of the foregoing fluoropolyether component is combined with from 10 to 48% by weight of a second comonomer having a hydrophilic group. Comonomers which are useful for polymerization with the telechelic perfluoropolyether include such ethylenically unsaturated comonomers as methyl and ethyl acrylate, methyl and ethyl methacrylate, cyclohexyl methacrylate, methyl 2-chloroacrylate, 2-ethoxyethyl methacrylate, 2,2,2-trifluoroethyl acrylate and methacrylate 2-cyanoethyl methacrylate, acrylic acid, and methacrylic acid, vinylidene chloride, vinylidene fluoride, methacryloyloxy-propyl-tris(trimethylsilyl)siloxane, and methacryloyloxy-methylpentamethyldisiloxane, and mixtures of two or more of these materials. Particularly preferred comonomers include methyl methacrylate, ethyl methacrylate and cyclohexyl methacrylate.

Dimensional stability of the polymers of U.S. Pat. No. 4,440,918 can be enhanced by including in the polymerization mixture from about 0.5 to 25 parts by weight of a polyfunctional monomer per 100 parts by weight of a polymerization mixture. Representative examples of useful polyfunctional monomers include ethyleneglycol diacrylate, ethyleneglycol dimethacrylate, diethyleneglycol dimethacrylate, allyl methacrylate, trimethylolpropane trimethacrylate, divinyl benzene, diallyl phthalate, and the polyacrylate and polymethacrylate esters of isocyanuric acids and s-triazines. Wettability of the polymers can be improved by polymerizing the telechelic perfluoropolyether with from about 2 to 10 parts by weight of the total weight of the polymerization mixture of a copolymerizable ethylenically-unsaturated monomer that has a hydrophilic group such as, for example, a hydroxy, carboxy, carbonamido, sulfonyl or sulfonamido group. Representative examples of useful water-soluble, ethylenically-unsaturated monomers include 2 hydroxyethyl acrylate and methacrylate, 3-hydroxypropyl acrylate, 4-hydroxybutyl acrylate, 5-hydroxypentyl acrylate, 2,3-dihydroxypropyl acrylate and methacrylate, N-vinyl-2-pyrrolidone, 2-carboxyethyl acrylate, 2-carbonamidoethyl methacrylate, 2-sulfoethyl methacrylate, 2-sulfoamidoethyl acrylate, vinylsulfonic acid, and mixtures thereof. Another technique to improve the wettability of the devices of the invention involves subjecting the surface of the device to the action of a glow discharge at a low pressure (e.g., 0.05 to 5 Torr) for from about 5 to 60 seconds in accordance with the disclosure of U.S. Pat. No. 3,940,207, the contents of which are incorporated by reference herein.

Polymerization of the telechelic perfluoropolyethers of U.S. Pat. No. 4,440,918 can be carried out by incorporating into the polymerization mixture a free-radical initiator, e.g., an organic peroxide or organic hydroperoxide, in accordance with known procedures. Alternatively, a photoinitiator, e.g., a ketone such as acetophenone, 2,2-diethoxyacetophenone, and the like, can be included in the copolymerizable mixture with some form of activating energy, e.g., ultraviolet radiation, being used to initiate the polymerization reaction.

When employing any of the foregoing polymerization mixtures containing an oxygen sensitive component, e.g., an acrylate ester such as methyl methacrylate, the polymerization reaction is effected in the absence or substantial absence of oxygen as is well documented in the art. The use of a sealed mold in accordance with this invention facilitates the maintenance of such suitably low oxygen levels and permits each individual mold to carry an internal inert atmosphere, e.g., nitrogen, carbon dioxide, etc., which blankets the polymerization mixture and isolates it from any oxygen which may be present in the external atmosphere.

A greatly enlarged view of a preferred mold apparatus which can be used in the practice of the present invention to fabricate a contact lens is shown in FIG. 1. By choosing suitably designed mold cavities, there can be obtained wide variety of modified lens shapes, e.g., toric, bifocal, truncated and/or ballasted contact lenses. A wide variety of materials or construction can be employed to fabricate mold 10; see, for example, U.S. Pat. No. 3,660,545. For the preparation of soft plastic articles such as soft contact lenses, a mold fabricated of polypropylene is suitable. To insure proper wetting of the optical surface of the mold by the lens-forming mixture it is desirable to first pretreat or hydrophilize the said surface by known methods. Mold 10 comprises a cylindrical interior wall 11 and concave continuously curved upwardly extending solid supporting surface 12 of an extent about equal to or greater than the lens to be formed therein. The mold dimensions can vary depending on the size of the contact lens desired, for example: outside diameter—17 mm; inner diameter above the mold cavity—15.6 mm; height of mold—7.5 mm; diameter of mold cavity—13.2 mm; central mold cavity radius—7.7 mm; depth of mold cavity (max)—3.3 mm; width of circular horizontal mold shoulder (located between the inner mold wall and the mold cavity—1.2 mm. Cover member 13 can also be constructed of any of a wide variety of materials including polymers such as polyethylene, polypropylene and cellophane, paper, aluminum and laminates of two or more such materials. The peripheral bottom edge 14 of cover 13 comes to rest against circular horizontal mold shoulder 15 when installed in the mold. The cover is kept securely in place and achieves a gas-tight seal with the mold by means of an annular compressible gasket 16 inserted within circumferential groove or channel 17 formed about the peripheral edge of cover member 13. Gasket 16 forcibly engages the interior of wall 11 when cover 13 is inserted in the cylindrical space defined by the mold wall. Numerous other embodiments for sealing the mold can be provided. For example, the cover member can be a simple film or laminate which is adhesively bonded to shoulder 15 of the mold. Alternatively, the cover member can take the form of a plug which threadedly engages the upper portion of the mold or is maintained in sealing engagement therewith by the external application of pressure. The plug can also be provided as part of a nesting arrangement where one mold is superimposed upon, and serves to seal the cavity of, another mold. Such an arrangement is advantageously used with the vertical polymerization column described above.

In practice, a precisely measured quantity of polymerizable or curable material 18 (shown in dotted line following polymerization, as to finished lens article 9) is introduced in the cavity of mold followed by sealing of the mold with cover 13 or other sealing means. Once cover member 13 is secured in place, there is defined within the mold a volume of open space 20 between the upper surface of polymerizable or curable material 18 and the lower surface of the cover member. Communicating with this open space is an annular reservoir 20 separate from surface 12 and containing a liquid 21 which is itself a volatile substance or possesses at least one volatile substance. Volatile liquid 21 is preferably a pure substance and is one which is at least as volatile as the most volatile component or volatile component mixture present in polymerizable or curable material 18. For example, in the case of a polymerization reaction mixture containing a volatile acrylate component (see recipes A-D, infra), volatile liquid 21 may be essentially pure acrylate corresponding to the acrylate in material 18. The dimensions of reservoir 20 are not critical, it only being necessary that it possess sufficient volume to accommodate an amount of volatile liquid 21 which will contribute a substantial amount of the volatilized substance present in open space 20 during spin casting.

Any suitable means can be utilized for dosing mold 10. Preferably, a double needle dispense system is employed wherein one needle dispenses a predetermined quantity of polymerizable mixture 18 onto surface 12 of the mold while the other needle dispenses volatile substance 21 in reservoir 20.

Alternatively, the sequence of dosing and sealing the mold can be reversed. Thus, in the case where the cover member is relatively thin and offers only slight resistance to puncture, the empty mold may be sealed with the cover member followed by dosing of the polymerizable mixture through the cover employing any suitable means such as the double needle dispense system referred to. In this embodiment the cover member can be provided with self-sealing capability or with a secondary seal to occlude the tiny punctures left when the double needle is withdrawn; however, in many cases, the diameter of the punctures will be so small that no special precaution need be taken to seal them against loss of volatiles from the mold.

Figure 2:
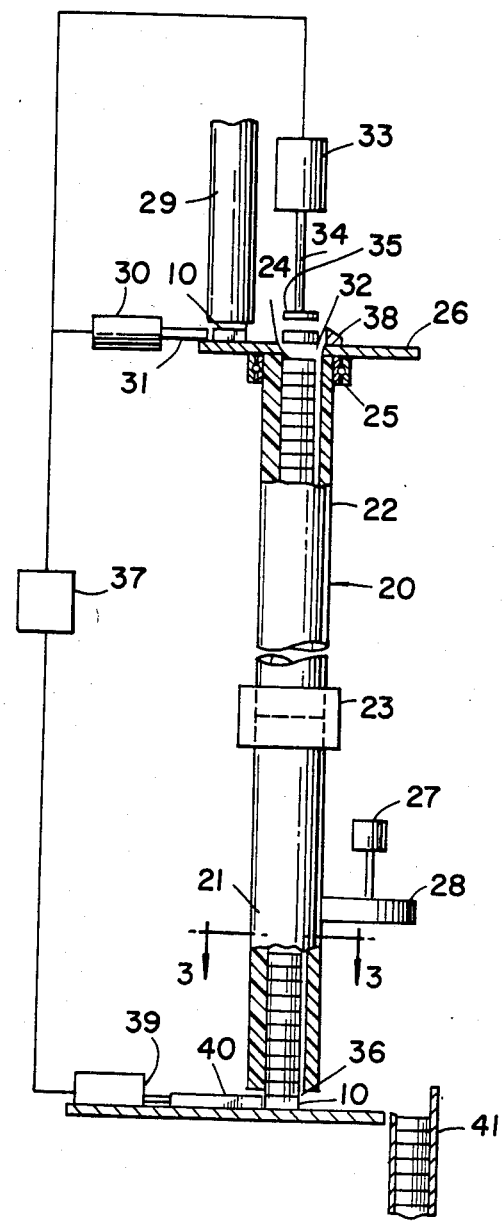
FIG. 2 is a semi-schematic side elevation view, partly cross-sectional, of a vertical polymerization column for use with the sealed mold of FIG. 1.

Referring in detail to FIG. 2, there is shown a rotatable polymerization column 20 comprising a polymerization tube 21 having a conditioning tube 22 coaxially mounted above polymerization tube 21 and coupled together using a conventional bearing 23. To maintain polymerization column 20 in a vertical position, the inlet end 24 is mounted in a conventional bearing 25 which in turn is secured to support member 26. A conventional motor 27 drives wheel 28 which in turn rotates polymerization column 20 at a desired speed required for the polymerization process to occur.

Figure 3:
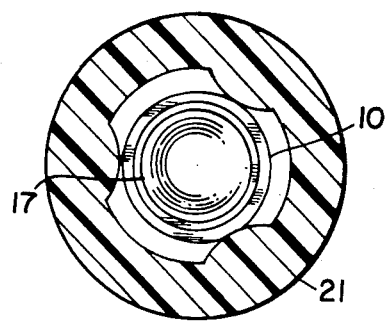
FIG. 3 is a cross-sectional view taken through line 20—20 of FIG. 2.

Disposed above support member 26 is mold magazine 29 containing a plurality of molds 10 each of which contains a metered amount of a polymerizable or curable material 17 as shown in FIG. 3.

Magazine 29 can also be a rotatable column which causes and/or maintains prewetting of the surface of the mold cavity. Desirably, magazine 29 is disposed in relationship to support member 26 such that the vertical distance between the outlet end of magazine 29 and support member 26 is slightly larger than the mold thickness.

A positive drive advancing means 30, conventionally operated by hydraulic, pneumatic or similar means, reats on support surface 26 and is disposed such that its pusher arm 31 is juxtaposed mold 10 which has been ejected from magazine 29. Support member 26 defines a slightly tapered opening 32 over the inlet end 24 of polymerization column 20, said defined opening 32 having a horizontal cross sectional area of mold 10. Disposed above opening 32 and inlet end 24 is a positive displacement drive means 33, conventionally operated by hydraulic, psneumatic or similar means, having a pusher arm 34. Pusher arm 34 terminates in a cylindrical configuration 35 having a horizontal cross-sectional area substantially equal to the horizontal cross-sectional area of molds 20 so that when extended, pusher arm 34 will impart an even and uniform force on mold 10 and force-feed said mold 10 into polymerization column 20. Since polymerization column 20 will generally be rotating, it is preferable to have pusher arm 34 mounted on conventional ball bearing means (not shown) so that it can freely rotate when feeding a mold 10 into rotation polymerization column 20.

Referring to FIG. 3, mold 10 is shown disposed within polymerization tube 21 out through outlet end 36. In the operational mode, control means 37 (such as a step wheel, timer, cam arrangement, or the like) synchronizes the activation of driver means 30 and driver means 33 in a repeatable cycle such that pusher arm 31 is first advanced to contact and push a dosed mold 10 along support member 25 into an open opening 32. To facilitate the positioning of mold 10, a stop member 38 is provided to prevent mold 10 from being pushed beyond opening 32. With mold 10 in position, driver means 33 is automatically activated to force mold 10 into the inlet end of polymerization tube 21. The control means are set such that the time between cycles of advancing mold 10 over opening 32 and forcing it into polymerization column 20 is sufficient to permit the polymerizable or curable composition in the bottommost mold to substantially form into a predetermined shaped article.

Conventional discharge driver means 39 is disposed adjacent to the outlet end 36 of polymerization tube 21 such that its pusher arm 40 can advance ejected mold 10 containing the formed article into container 41 for collection. Driver means 39 could also be coupled into control means 37 and activated following the force-feeding of mold 10 into polymerization column 20 which causes mold 10 to be ejected. This will provide a complete automated device for producing spin cast articles, such as soft contact lenses, on a continuous basis.

In an alternate embodiment, the driver means 39 could be replaced by a conventional moving conveyor belt which would receive the ejected molds and advance them to a collection station where they could be fed into a container such as 41 shown in FIG. 2. In another alternate embodiment, conventional sensing means such as photoelectric tubes, mechanical switches and the like, can be arranged about opening 32 so as to provide a signal to activate driver means 33 when a mold is placed in alignment over opening 32.

Lens-forming liquid polymerizable materials (based on total weight) for use in a spin casting method and mold of this invention can comprise the following recipes:

| Component | Parts By Weight |
|---|---|
| Recipe A | |
| Telechelic perfluoropolyether of the formula | |
| 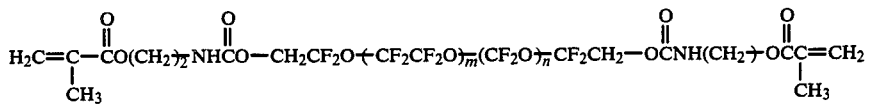 | |
| wherein m/n is about 0.6 and m is about 8.0 | 9.8 |
| methyl methacrylate | 0.2 |
| 2,2-diethoxyacetophenone | 0.05 |
| Recipe B | |
| Telechelic perfluoropolyether of the formula | |
| 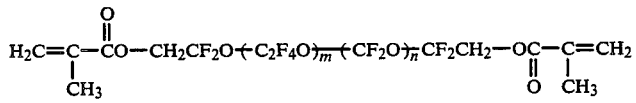 | |
| wherein m/n is about 0.6, m is about 3 and n is about 5 | 0.7 |
| methyl methacrylate | 3.0 |
| diisopropyl peroxydicarbonate | 0.02 |
| (as free radical polymerization initiator) | |
| Recipe C | |
| Telechelic perfluoropolyether of | |

-continued

| Component | Parts By Weight |
|---|---|
| Recipe A | |
| N—vinylpyrrolidone | 7.0 |
| methyl methacrylate | 2.0 |
| 2,2-diethoxyacetophenone | 1.0 |
| | 0.05 |

Recipe D
Telechelic perfluoropolyether of the formula $$H_2C=\underset{CH_3}{\underset{|}{C}}-\overset{O}{\overset{\|}{C}}O-CH_2CH_2NH\overset{O}{\overset{\|}{C}}O-CH_2-CF_2O-(CF_2CF_2O)_{\overline{m}}-(CF_2O)_{\overline{n}}CF_2-CH_2-OCNHCH_2CH_2-O\overset{O}{\overset{\|}{C}}-\underset{CH_3}{\underset{|}{C}}=$$

| | |
|---|---|
| wherein m/n is about 0.7, m is about 15, n is about 21, and the formula weight of the perfluoropolyether is about 4000 | 7.0 |
| methyl methacrylate | 3.0 |
| 2,2-diethoxyacetophenone | 0.05 |

In the next operation, sealed, dosed mold 10 is made to rotate about its vertical axis at a predetermined speed calculated to provide a centrifugal force which causes polymerizable or curable mixture 18 to spread radially outwardly and to assume a predetermined geometric configuration 19 corresponding to that of the lens product desired. Rotational speeds of, for example, 300 r.p.m. and lower and 600 r.p.m. and higher can be conveniently used. The precise rotational speed to employ in a particular molding operation will, of course, depend upon the nature and geometric configuration of the article to be molded and the physical and chemical characteristics of the polymerizable mixture from which the article is formed, such factors being readily apparent to those skilled in the art. Polyemrization of the lens-forming material can be carried out with free radical catalysts and/or initiators of the type in common use in vinyl polymerization. Such catalyst species can include the organic peroxides, the alkyl percarbonates, hydrogen peroxides, and inorganic materials such as ammonium, sodium or potassium persulfate. Polymerization temperatures can vary from about 20° C. and lower, to about 100° C., and higher. Polymerization reaction times can vary from several minutes to several hours, e.g., about 30 minutes to about 10 hours.

Polymerization of the monomer or prepolymer material can also be effected using, for example, radiation (U.V., X-ray, microwave, or other well-known forms of radiation) with/without the presence of well-known initiator(s) and/or catalyst(s).

The optical configuration of the finished lens is the result of the interplay of two precisely controllable factors, namely, the shape of the mold cavity which governs the shape of the front, or convex, surface of the lens and the spin rate of the mold providing the centrifugal force which governs the shape of the back part of the lens, for miniscus, which is the surface of the lens in direct contact with the cornea. Through selection of specific spin rates and mold shapes, it is therefore possible to provide finished lenses of predetermined configuration across a wide range of diopters.

The following examples are illustrative of the present invention.

EXAMPLE 1

The following monomer formulation is prepared:

| Component | Parts by Weight |
|---|---|
| LTM* | 82.5 |
| N—vinylpyrrolidone | 7.5 |
| methyl methacrylate | 10.0 |

*LTM (CAS name) - ethene, tetrafluoro-, homopolymer, oxidized, (hydroxymethyl) - terminated, bis [[(2-methyl-1-OXO-2-propenyl)oxy]ethyl]carbamate.

An uncapped concave mold having a 10.2 mm casting surface diameter, a 2.04 mm casting surface saggital depth, an annular reservoir of 0.7 mm at its widest point and 0.3 mm in depth is positioned in a fixture which has a nitrogen environment containing less than 50 ppm oxygen. Twenty microliters of the liquid monomer formulation is dispensed onto the mold's casting surface and two microliters of methyl methacrylate is dispensed within the reservoir. A cap is seated on the mold's shoulder and hermetically seals the mold. The hermetically sealed mold containing the liquid monomer formulation is spun for thirty minutes at 342 rpm. During this time, the liquid monomer asymptotically assumes a geometry which is dictated by the spin rate, casting surface geometry and monomer's surface tension and density. The spun surface stabilization is followed by long wave ultraviolet light irradiation for thirty minutes. The ultraviolet light, which has an intensity of 15000 microwatts per square centimeter, polymerizes the liquid monomer. Following polymerization, the molded lens article is removed from the mold and cleaned. There is obtained a contact lens article possessing good optics, transparency, inertness to bacteria, biocompatibility with the cornea, dimensional stability and good mechanical properties.

The presence of copolymerized N-vinylpyrrolidone in the lens-forming polymer imparts good wettability to the finished lens. Thus, the lens can pick up from 1-2 weight percent water when immersed in physiological saline. In lieu of N-vinylpyrrolidone, one can use minor amounts of other monomers capable of imparting wettability to the finished lens, e.g., 2-hydroxyethyl methacrylate.

What is claimed is:

1. In a mold for spin casting a precisely configured article which possesses at least one precisely configured surface for spin casting the article from an initially liquid polymerization reaction mixture containing at least one substance which is volatile under spin casting conditions and means for sealing the mold cavity against any appreciable loss of said volatile substance from beyond the open space lying between the upper surface of the liquid polymerization reaction mixture and the lower surface of said sealing means, the improvement which comprises a reservoir which is separate from said precisely configured surface and which communicates with said open space, said reservoir being adapted to receive a quantity of liquid volatile substance such that during spin casting, volatilized substance from the contents of the reservoir will be present in the open space reducing the loss of volatile substance from the polymerization reaction mixture.

2. The mold of claim 1 wherein said reservoir is provided as an annular channel surrounding the precisely configured surface.

3. The mold of claim 1 adapted to provide an opthalmic lens.

4. The mold of claim 2 adapted to provide an opthalmic lens.

5. The mold of claim 1 wherein said sealing means is provided as a cover held in fluid-tight relationship with the mold cavity by a laterally compressible circumferential gasket disposed between the peripheral wall of the cover and the interior wall of the mold.

6. A method of spin casting a precisely configured article which comprises:
(a) spinning a mold containing a predetermined quantity of a liquid polymerizable material containing at least one component which is volatile under spin casting conditions, said spinning being carried out about the vertical axis of the mold and at a speed which is sufficient to cause the liquid polymerizable material contained in the mold to be radially outwardly displaced and to thereby assume a predetermined geometric configuration, said mold being provided with gas-tight sealing means to prevent appreciable loss of volatile component during spinning, there being a volume of open space defined between the upper surface of the liquid polymerizable mixture and the lower surface of the sealing means, said mold being further provided with a reservoir containing a quantity of liquid volatile substance such that during said spinning of the mold, volatilized substance from the contents of the reservoir will be present in the open space reducing the loss of volatile substance from the liquid polymerization reaction mixture to said open space; and,
(b) causing the liquid polymerizable material in the spinning mold to undergo polymerization thereby providing a shape-retaining, precisely configured solid polymeric article.

7. The method of claim 6 wherein the geometric configuration of the mold is suitable for making a contact lens.

8. The method of claim 7 wherein the liquid polymerizable material and liquid volatile substance are introduced into the unsealed mold and the mold is thereafter provided with gas-tight sealing means.

9. The method of claim 7 wherein the liquid polymerizable material and liquid volatile substance are introduced into the mold after the mold has been provided with gas-tight sealing means.

10. The method of claim 7 wherein the liquid volatile substance in the reservoir is as volatile as, or more volatile than, the volatile substance present in the liquid polymerizable reaction mixture.

11. The method of claim 10 wherein the liquid volatile substance is substantially pure.

12. The method of claim 7 wherein the liquid polymerizable reaction mixture comprises a telechelic perfluoropolyether component and at least one ethylenically unsaturated comonomer component which is volatile under the conditions of spin casting and the liquid volatile substance is the same as said ethylenically unsaturated comonomer component.

13. The method of claim 12 wherein the telechelic perfluoropolyether component has a backbone having a number average molecular weight between about 500 and 15,000 and has the formula $$(C_4F_{2k}O)_p(C_qF_{2q})$$

wherein p represents the number of —$C_kF_{2k}O$— subunits in said backbone and is an integer of from 3 to 200; q is an integer of from 1 to 4; and k may be the same or different, with each of said —$C_kF_{2k}O$— and —$C_qF_{2q}$— subunits being randomly distributed in the backbone.

14. The method of claim 13 wherein the ethylenically unsaturated component is an acrylate.

15. The method of claim 14 wherein the acrylate is methyl methacrylate.

* * * * *